(12) United States Patent
Everest

(10) Patent No.: US 7,801,939 B1
(45) Date of Patent: Sep. 21, 2010

(54) COMPLEX AND HYPERCOMPLEX INCLUSIVE INTERVAL EXPRESSION EVALUATIONS WITH STABLE NUMERIC EVALUATIONS AND PRECISION EFFICACY TESTING

(76) Inventor: Michael T. Everest, 222 Del Norte Ave., Sunnyvale, CA (US) 94085

( * ) Notice: Subject to any disclaimer, the term of this patent is extended or adjusted under 35 U.S.C. 154(b) by 1282 days.

(21) Appl. No.: 11/336,166

(22) Filed: Jan. 19, 2006

(51) Int. Cl.
*G06F 7/38* (2006.01)
(52) U.S. Cl. ..................................... 708/511
(58) Field of Classification Search ............... 708/611, 708/622
See application file for complete search history.

(56) References Cited

U.S. PATENT DOCUMENTS

| | | | | |
|---|---|---|---|---|
| 4,622,650 | A * | 11/1986 | Kulisch | 708/603 |
| 6,915,321 | B2 * | 7/2005 | Walster et al. | 708/446 |
| 2002/0184283 | A1 * | 12/2002 | Steele, Jr. | 708/495 |
| 2006/0139349 | A1 * | 6/2006 | Reshetov et al. | 345/426 |

OTHER PUBLICATIONS

Higham, Nicholas J. "Accuracy and Stability of Numerical Algorithms" 1996, Society for Industrial and Applied Mathematics (SIAM), Philadelphia. ISBN 0-89871-355-2. pp. 78-79.
Pekovic, Miodrag S. et al., "Complex Interval Arithmetic and Its Applications" 1995, Wiley-VCH, Berlin; Weinheim; New York; Chichester; Brisbane, Singapore, Toronto; ISBN 3-527-40134-2 Sprigner-Vertag Berlin, Heidelberg, and New York. pp. 15-32.
Pekovic, Miodrag S. et al., "Complex Interval Arithmetic and Its Applications" 1995, Wiley-VCH, Berlin; Weinheim; New York; Chichester; Brisbane, Singapore, Toronto; ISBN 3-527-40134-2 Sprigner-Vertag Berlin, Heidelberg, and New York. pp. 52-56.
Pekovic, Miodrag S. et al., "Complex Interval Arithmetic and Its Applications" 1995, Wiley-VCH, Berlin; Weinheim; New York; Chichester; Brisbane, Singapore, Toronto; ISBN 3-527-40134-2 Sprigner-Vertag Berlin, Heidelberg, and New York. pp. 70-88.
Kuipers, Jack B., "Quaternions and Rotation Sequences" 1999, Princeton University Press, Princeton, New Jersey, ISBN 0-691-05872-5. p. 107.

* cited by examiner

*Primary Examiner*—Chuong D Ngo
(74) *Attorney, Agent, or Firm*—Hickman Palermo Truong & Becker LLP

(57) ABSTRACT

Improvements to optimal interval operators are developed for interval expression evaluation using arithmetic and real power operators applied to complex and hypercomplex number systems. A method for determining efficacy of numeric precision, incorporating minor changes to interval operators, provides detection of insufficient numeric evaluation precision.

8 Claims, 4 Drawing Sheets

Prior Art

FIG.2

| Operator | Special Form | Number System | Branchcut |
|---|---|---|---|
| Non Intrinsic Operators: | | | |
| 050  inclusive metacomplex scalar | | Metacomplex | |
| 052  inclusive rigid body rotation | stable point multiplication for | Hypercomplex | |
| 054  inclusive invert operator | unitized metacomplex form | Metacomplex | |
| 056  unit power operator | | Metacomplex | |
| 058  zero power operator | | Metacomplex | |
| Direct Intrinsic Operators: | | | |
| 060  optimal inclusive additive operator | | Metacomplex | |
| 062  inclusive metacomplex shape converter | | Metacomplex | |
| Unitizing Range Operators: | | | |
| 064  inclusive metacomplex range | unitized metacomplex form | Metacomplex | |
| Multiplication Operators: | | | |
| all should use: (stable point multiplication, form and unitized metacomplex form) | | | |
| 066  stable inclusive complex multiplication | stable Krier real root form | Complex | |
| 068  stable inclusive quaternion multiplication | stable Krier real root form | Quaternion | |
| 070  cubic inclusive quaternion multiplication | | Quaternion | |
| Contractive Power Operators: (all:unitized metacomplex form) | | | |
| 072  inclusive complex contraction power | unitized contraction power form | Complex | Yes |
| 074  inclusive hypercomplex contraction power | unitized contraction power form | Hypercomplex | Yes |
| 076  stable inclusive complex square root | radius square root form | Complex | Yes |
| 078  stable inclusive hypercomplex square root | radius square root form | Hypercomplex | Yes |
| Non-Linear Unitizing Expansion Power Operators: | | | |
| (all:unitized metacomplex form, robust expansion nonlinear search form, expansion search limit forms) | | | |
| 080  inclusive robust complex expansion power | | Complex | maybe |
| 082  inclusive hypercomplex expansion power | | Hypercomplex | maybe |
| Stable Explicit Power >1 Operators:(all:unitized metacomplex form) | | | |
| 084  stable inclusive complex square power | optimal inclusive squaring form | Complex | |
| 086  stable inclusive hypercomplex square power | optimal inclusive squaring form | HyperComplex | |
| 088  stable inclusive metacomplex three halves power | three halves power form | Complex | Yes |

COMPLEX AND HYPERCOMPLEX INCLUSIVE INTERVAL EXPRESSION EVALUATIONS WITH STABLE NUMERIC EVALUATIONS AND PRECISION EFFICACY TESTING

CROSS-REFERENCE TO RELATED APPLICATIONS

Not applicable.

FEDERALLY SPONSORED RESEARCH

Not applicable.

SEQUENCE LISTING OR PROGRAM

Not applicable.

BACKGROUND OF INVENTION

This invention was conceived as way of improving processing of complex and hypercomplex intervals.

FIELD OF INVENTION

This invention generally relates to numerical interval processing and numerical proofs for complex and hypercomplex evaluations.

PRIOR ART

Overview

Prior art does not provide complete system for optimal interval with stable numerical algorithms.

Accuracy and Stability of Numerical Algorithms, 1996
*Accuracy and Stability of Numerical Algorithms*, by Nicholas J. Higham, Copyright 1996, Society for Industrial and Applied Mathematics (SIAM), Philadelphia. ISBN 0-89871-355-2

The book describes numerical error analysis. Its analysis of rounding error for complex numbers was important to understanding a similar analysis for quaternions.

C++ Toolbox for Verified Computing, 1995
*C++ Toolbox for Verified Computing*, by Ulrich Kulisch, Rolf Hammer, Matthias Hocks, Dietmar Ratz, Copyright 1995, Springer-Verlag, Berlin, Heidelberg. ISBN 3-540-59110-9 Springer-Verlag Berlin, Heidelberg, and New York.

The book describes the use of interval processing in mathematical proofs for parametric spaces. The scope is general, but it does not provide a description of optimal complex intervals.

Complex Interval Arithmetic and Its Applications, 1995
*Complex Interval Arithmetic and Its Applications*, by Miodrag S. Pekovic and Ljiljana D. Petkovic, Copyright 1998, WILEY-VCH, Berlin; Weinheim; NewYork; Chichester; Brisbane; Singapore; Toronto; ISBN 3-527-40134-2 Springer-Verlag Berlin, Heidelberg, and New York.

Overview

This book emphasizes the use of optimal complex arithmetic on discs and many applications, and discusses the not so optimal. Techniques for optimal arithmetic and integer powers for complex numbers are described. This book discusses additional optimal disc forms which are not improved upon in this patent application, such as logarithmic, exponential, and some other transcendental functions.

Optimal Multiplication Problems

Overview

The book provides several references to a N. Krier, a German who describes in doctoral paper, apparently in German, and a method of performing optimal complex disc multiplications. The Krier formula given in this book (I don't know about the original Krier work), does not appear to produce the correct answers—see page 23. See also page 82 for additional discussion of the Krier results that are useful. (See my own invention which agrees with results for page 82). The authors note several shortcomings in the use of the formulas, and thus discourage use of this powerful tool.

Optimal Multiplication Computation Problem

First, at the bottom of page 23, it is noted that "the presented minimal arithmetic requires a great deal of computation, including the calculation of the zero of third degree polynomial." No solution to this problem is provided.

Inclusion Isotonicity Property Problem

The authors immediately continue with a second problem at the very bottom of page 23, "Besides, a very important inclusion isotonicity property is not generally valid for multiplication (and, consequently, for division (1.15))". No solution to this problem is provided, but an example of the problem is indicated on page 24.

Real Powers

The book develops algorithms for finding optimal disc enclosures for positive integer powers. Optimal discs for real powers, 1/k, where k is an integer are presented. The authors fail to create a comprehensive real power interval operator for all real powers. Also, on page 82, notes that squaring a disc interval is equivalent to Krier's multiplication when squaring. The author does not work out equations to provide an explicit formula for squaring.

Quaternions and Rotation Sequences, 1999
*Quaternions and Rotation Sequences*, by Jack B. Kuipers, Copyright 1999, by Princeton University Press, Princeton, N.J., ISBN 0-691-05872-5.

This book provides background on the arithmetic of quaternions, but no interval analysis or details on numeric processing. Quaternions are important example of hypercomplex numbers of the 4th dimension; however, but there is no discussion of hypercomplex numbers of other dimensions.

OBJECTS AND ADVANTAGES

Accordingly, several objects and advantages of the invention are:

Comprehensive Optimal Metacomplex Inclusiveness

This interval processing improvement provides comprehensive inclusive metacomplex (complex and hypercomplex) interval operators for adding, subtracting, multiplying, dividing and raising to any real power. Numerically stable, explicit, forms are shown. The formula for multiplication is particularly important, because it completes a basic arithmetic package when optimal division is implemented with multiplication times the invert of the divisor.

Precision Efficacy Problem

Descriptions of interval analysis appear curiously lacking in discussion of evaluation precision. Interval analysis is usually considered as an appendage to error analysis where exact values are approximated during processing. Thus, the loss of precision in results is related directly to numeric precision. However, for topological analysis, such as when the initial values are areas of the complex or hypercomplex plane, numerical error is not the only cause for the expansion of intervals. A method of dual rounding direction rounding is described which detects the effect of inadequate numeric precision.

Conclusion

The use of optimal operators can greatly decrease the expansion of inclusive intervals. The new algorithms provide stable evaluations for all basic arithmetic.

Further, objects and advantages will become apparent from a consideration of the ensuing description and drawings.

SUMMARY

Improved methods of optimal complex and hypercomplex interval processing are described for multiplication and raising to a power and other operators. Interval operators are provided to create optimal enclosures for arbitrary dimensions for hypercomplex numbers. A method is provided for judging the adequacy of numeric precision in order to automatically switch, if desired, to a higher precision.

DRAWINGS

Figures

FIG. 2 shows a list of optimal inclusive disc interval operators.

Figure 1:
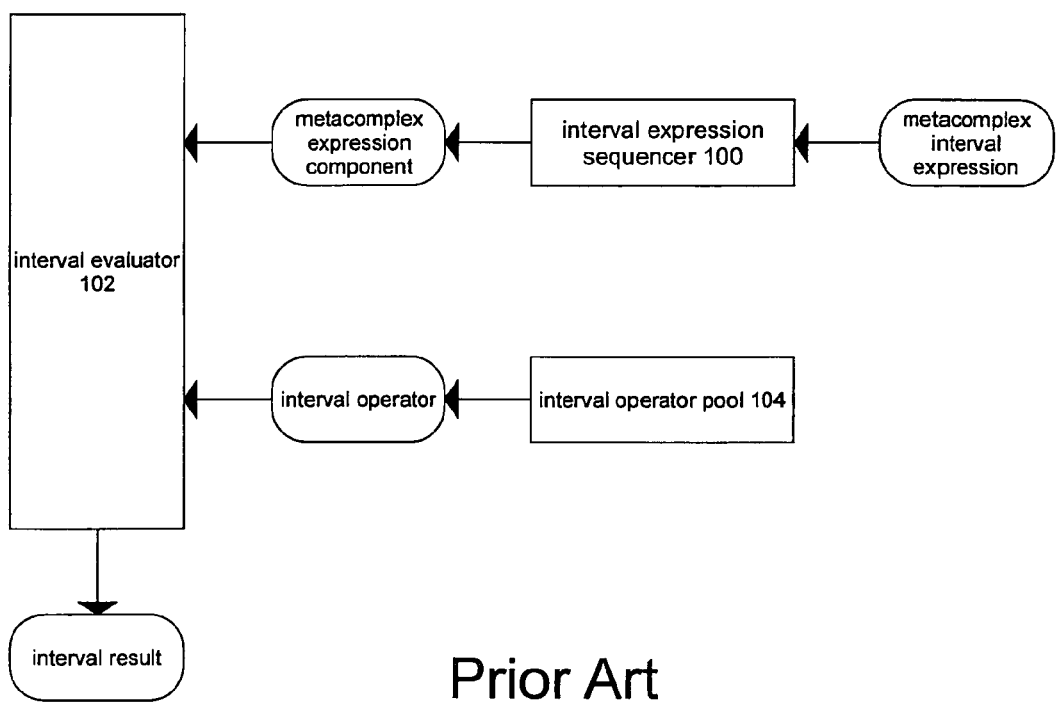
FIG. 1 shows the basic components for evaluating an interval expression, as in the prior art.

REFERENCE NUMERALS 050 inclusive metacomplex scalar
052 inclusive rigid body rotation
054 inclusive invert operator
056 unit power operator
058 zero power operator
060 optimal inclusive additive operator
062 inclusive metacomplex shape converter
064 inclusive metacomplex range
066 stable inclusive complex multiplication
068 stable inclusive quaternion multiplication
070 cubic inclusive quaternion multiplication
072 inclusive complex contraction power
074 inclusive hypercomplex contraction power
076 stable inclusive complex sqrt power
078 stable inclusive hypercomplex sqrt power
080 inclusive robust complex expansion power
082 inclusive hypercomplex expansion power
084 stable inclusive complex square power
086 stable inclusive hypercomplex square power
088 stable inclusive metacomplex three halves power
100 interval expression sequencer
102 interval evaluator
104 interval operator pool
110 dual evaluator
112 dual operator pool
114 dual tester
116 precision iterator

DETAILED DESCRIPTION

Interval Expression Evaluator Embodiment—See FIG. 1

Description: Interval Expression Evaluator Embodiment, FIG. 1

FIG. 1 shows the traditional and prior art arrangement of three components to implement an INTERVAL EXPRESSION EVALUATOR EMBODIMENT. Although, this arrangement of three components is well known, the novelty lays in the enhancement of the technology of the interval operators within the interval operator pool (104). This description is not a new invention. The improved interval operators, described later, are new.

Interval Expression Sequencer (100)

An interval expression sequencer (100) defines metacomplex interval expression as a mathematical mapping on a point collection as an evaluation sequence of metacomplex expression components consisting of interval operands and interval operators. Interval operands may be input or postimage intervals representing the ongoing results of interval processing. In order to handle multivalued mapping operators, such as square root operators, the interval expression sequencer (100) must also include, where needed, branchcut criteria.

Interval Operands

Each interval operator takes one or more interval operands as parameters acting on a bounded set of points, usually within the complex (of 1 imaginary axis) and hypercomplex number systems (having 2 or more imaginary axes). The term metacomplex is used to simultaneously refer to both the complex and hypercomplex number systems.

Herein, interval operands are usually called a disc or metadisc: a metadisc is the collection of points within a circle or a higher dimensional circle such as a sphere. In some cases one of the operands may be constant or range of values. A metadisc is ideal, but some other forms are used, such as a metasquare: a metasquare is a square, cube, or a higher dimensional square, called a hypercube. Metasquares often occur as a shape interval. A shape interval often occurs when subdividing a parameter space into smaller portions; other space-filling shapes such as hexagons may occur.

A metasquare specifies each of its boundary sides. In all cases, it is useful to consider all values defining an operand as exact values. That is a center location is an exact value, whether floating point or otherwise. Similarly, the radius is A complex, hypercomplex or metacomplex adjective often precedes a disc interval to indicate the type of underlying number system.

Disc Interval, Metacomplex Disc Interval, Etc.

A metadisc is usually represented by a center location and a radius; such intervals are called disc intervals.

Postimage Intervals, Preimage Interval

A postimage interval is simply an interval generated when an interval operator acts on interval operands to produce a resulting interval. A preimage interval is another name for an interval operand.

Shape Intervals

Even within a system operating on disc intervals, other shapes may occur. These arise as a result of subdividing a parameter space. These shape intervals must be converted into a standard interval such as a disc interval.

Constant Interval Expressions: Implicit and Explicit

When the metacomplex interval expression contains no variables, it is called a constant interval expression. This form can be an implicit interval expression or an explicit interval expression.

When an interval expression is exact, such 2+1/(3+2 I)^2, then the interval expression is implicit and represents the mapping of a single point to a single point. As the evaluation proceeds, each mathematical mapping will likely generate some numeric error, which is processed as an inclusive interval; thus there is an implicit interval process.

An explicit inclusive interval expression means includes one or more interval operands as part of its original input values. Suppose we let OptimalComplex[2+I, 1/10] define a center location and radius of a disc interval in the complex plane. Then there is an explicit interval in the interval expression, OptimalComplex[2+I, 1/10]+1/(3+2 I)^2.

Branchcut Criteria, Nearest Branchcut Position

In order to evaluate an interval expression which incorporates non-integer real powers, whether positive or negative, an interval operator, such as a square root operator, must know which of several roots is the correct root, in order to determine the postimage interval. It is sufficient to determine the branchcut for the center of an interval, the center location. One simple method is to specify a nearest branchcut position for all branchcuts of the center location of a disc interval under consideration. For example, if the nearest branchcut location is specified as 1, on the real axis, in the complex plane, and a square root is taken, then the branchcut chosen is that which lies in the half plane where the real values are greater than 0. Thus, a general solution for complex and hypercomplex systems is to choose the nearest branchcut.

In the complex plane, the closest branchcut can be defined as the one whose argument angle is nearest, whether rotating clockwise or counterclockwise around the origin. For example, note that −0.9 Pi radians is closer to Pi radians (via clockwise rotation) than it is to −0.5 Pi radians (counterclockwise rotation).

Intrinsic Expression Mode

An intrinsic expression mode is mode of the interval expression sequencer (100) where at least some operand is an actual metacomplex interval (not merely a single point value) and an intrinsic interval operator is indicated. An intrinsic interval operation is any interval operator which distorts the shape of the metacomplex interval. For example, power functions, and multiply or add of two metacomplex intervals. For example, if the original interval is the shape of a disc, and is raised to an integer power, then the true shape of the resulting image cannot be described as a disc. Of course, it is typical that the result is an inclusive disc which is large enough to fully enclose whatever intrinsic interval defines the postimage interval. However, if the entire expression consists of scalars times metacomplex intervals, then the resulting postimage intervals are not distorted.

Interval Operator Pool (104)

The interval operator pool (104) is a collection of implementations of interval operators. An interval operator maps interval operands into a postimage interval. Each interval operator has a mathematical mapping operation and a postimage warranty.

Mathematical Operators

For our purposes, the mathematical operator is a arithmetic operator or a real power operators. Other operators are available: see *Complex Interval Arithmetic and Its Application*.

Postimage Warranty, Inclusive Warranty

A postimage warranty (my term) is a logic property of an interval operator. An inclusive warranty is that images of all preimage points are included in the postimage interval. This follows naturally from one of the main goals of interval analysis which is to find the worst possible error intervals.

Dual Operator Pool (112)

A dual operator pool (112) is an extended form of the interval operator pool (104) which performs two types of rounding, and therefore two interval results; one of the interval results is the a pure inclusive result. For details on this mode refer to the DUAL ROUNDING INTERVAL EXPRESSION EVALUATOR EMBODIMENT of FIG. 4.

Interval Evaluator (102)

The interval evaluator (102) performs the numeric evaluation of an interval expression defined by a interval expression sequencer (100) by calling upon specified interval operators of the interval operator pool (104). This step-by-step evaluation of interval operands applied to interval operators produces a sequence of postimages, all of which may also serve as interval operands. The numeric precision of evaluation will determine the quality of "tightness" of the resulting postimage intervals, and the interval operators must support the specified precision of the numeric evaluation.

For example, Mathematica has an expression evaluation called "N", which performs numeric evaluation of mathematical expressions, including complex intervals; N can be considered as a interval evaluator (102). The interval expression passed to "N" defines the mathematical operations and can be considered as an interval expression sequencer (100). No doubt, inside the Mathematica® software machinery, the "N" routine calls upon support routines to perform the action of the interval operators. Taken together, these support routines can be called an interval operator pool (104).

In some applications, the entire embodiment may be compiled and assembled into a single small and optimized subroutine.

Note that all numeric processing is performed by interval operators of the interval operator pool (104), and the interval evaluator (102) sequences the calls to interval operators and manages the resulting postimage intervals.

Operation: Interval Expression Evaluator Embodiment, FIG. 1

The interval evaluator (102) usually has a default value used to specify numeric precision. For example, many applications always use double precision floating point as the default numeric precision. In other cases, a specific numeric precision may be specified for use in evaluating an interval expression.

Inclusive Interval Operator Compendium: See FIG. 2, FIG. 3

Overview

This section describes new and improved optimal metacomplex interval operators, together with a summary of previously known operators. Together, all simple arithmetic and real power operators are available, together with some degenerate and special operators. Interval processing is very strict; the goal, in essence, is to provide a numerical proof of the postimage warranty, which is the inclusive warranty described above.

True Image Shape, Intrinsic Dilution

All these operators operate on metadisc operands. The points defined by the preimage intervals produce a postimage interval. Even when the mapping is theoretically perfect, the resulting shape, defined by all postimage points, will not necessarily be a metadisc; this shape, whatever it may be, is called the true image shape. Its convenient to convert this true image shape into an optimal metadisc interval. That is, given that the final shape must be a metadisc, the resulting postimage interval, is the smallest possible metadisc, which fully encloses the true image shape. If the true shape image is not metacircle then there are points lying inside the optimal disc interval and outside the true image shape. These points are said to dilute the inclusive interval and constitute what I choose to call intrinsic dilution.

Numeric Dilution:

Numeric dilution occurs because numerical processing produces numeric errors. The result is that the exact best values cannot be known. For any vagueness in the result, the overriding concern is to preserve the warranty for inclusive image logic. Thus, results need to be rounded-off by increasing the metacircle radius for inclusive results.

Numeric Stability

Except for some considerations for some real powers, all of the arithmetic interval operators can be implemented using numerically stable techniques.

Expression Calculations

An expression evaluation is considered to be numerically stable if the basic operations can all be performed with the resulting value's relative precision guaranteed to be exact except for minor rounding and other small errors. In particular, cancellation of digits, such as when adding nearly equal positive and negative numbers, of which at least one value is approximate, is not allowed unless it is known that the error is always kept to the equivalent of a few URE rounding errors. For IEEE arithmetic, and easily implemented software floating point which incorporates IEEE rounding methods, exact values of different signs can always be added together with minimal (i.e. 1 URE) rounding error.

Polynomial Approximation

Optimal disc interval processing for some functions, not basic arithmetic, requires evaluation of a nonlinear real function. These functions are very smooth and easy to interpolate using standard methods for approximation functions.

Complex and Hypercomplex Multiplication Error Analysis:
Stable Point Multiplication Form:

Complex multiplication and quaternion multiplication of exact floating point values may be needed while processing some disc intervals. The general expanded forms for complex are easily extended to hypercomplex systems. Rounding errors, measured in URE, appear are less than Sqrt[n]*n*URE.

Resulting Error

On page 79, Nicholas Higham, in his book, *Accuracy and Stability of Numerical Algorithms*, indicates that the worst case IEEE rounding error for an expanded complex multiply is Sqrt[2]*2URE, with respect to the absolute value of the result. Note that a nURE value is given by (n*u)/(1−n*u) on page 69 of the same book, where u is the unit rounding error for the floating point mantissa size. A three dimensional multiply is useful for squaring a three dimensional number (i.e. the last imaginary axis, the "k" axis of a quaternion, is zero). Using similar logic, I deduce Sqrt[3]*3URE. Similarly for four dimensions, Sqrt[4]* 4URE is obtained. Note, the Euclidean error of the final result is this rounding error times the absolute value of the full multiplication result. Be careful about the ordering of values: for 4 dimensions, each axis is the sum of four terms, each consisting of a single multiply; summing is performed in a tree-like form: (term1+term2)+(term3+term4).

Derivation

But where do I obtain the Sqrt[3], and Sqrt[4]==2, arise? In the Higham book, the 2 of Sqrt[2] comes about from the fact that 2 (a^2+b^2) (c^2+d^2)≧((Abs[ac]+Abs[bd])^2+(Abs[ad]+Abs[bc]^2), where all the {a,b} are the components of a complex number and similarly for {c,d}. The inequality relates to the norm. This inequality becomes equality when all a==b==c==d. Note the value 2 in the inequality. Similarly, for equal component values, and an analogous inequality, the 2 becomes a 3 in three dimensions, and a 4 for quaternions. (Note, for three dimensions, it is meant that the last component value, the "k" axis", of each operand is zero).

Rounding Errors and Worst Case Intervals

The rounding errors for disc intervals can be very small compared to the above described intrinsic dilution errors. It can be very tempting to ignore the rounding errors because they add so much time to computation. This can be dangerous, particularly when working with critical calculations. It is important to keep track of all errors in the interval operand algorithms so that the radius of the resulting disc interval can be appropriately increased to include the worst case error in the new center location of the disc interval, as well as any errors in calculating the new radius. Several methods are suggested.

Traditional Interval Processing

Traditional methods of tracking worst case error, for real value processing, involve using CPU rounding modes (or software implementation) to round values in higher and lower to determine worst case results. Absolute errors of real intervals can be extracted by differencing the lowest and highest bounds of an interval. This method of tracking errors can be very fast when floating point is implemented in software. In modern hardware implementations, changing rounding modes has deleterious effects on the CPU pipelines. Traditional interval processing is very good at handling all types of arithmetic errors, including massive digit cancellation.

Fast Multiply Interval Processing

Modern CPU floating point has very fast floating point multiplies, which, when the underlying rounding errors can be known, allow the fast calculation of absolute errors and other interval adjustments. I developed this method myself. Suppose using error analysis, we know the number of unit rounding errors for a particular real valued result. We can define a real valued interval which will encompass the worst case error using two multiplies, which should be faster and cleaner than changing CPU floating point flags and repeating the operation with alternate rounding. Here is how. Recall that a nURE=(n*u)/(1−n*u), where u is the unit rounding error for the floating point mantissa size, and n is the number of unit rounding errors. If we multiply by a value by nURE, then an absolute error can be extracted. Similarly, if we multiply by 1+nURE, then the value can be adjusted upward to obtain an upper worst case error bound. Similarly by multiplying by 1/(1+nURE), a lower error bound can be obtained. Such calculations should include their own error compensation. All constants can be precalculated for each specific floating point mantissa length.

Safe Versus Unsafe

This document introduces the concept of safe and unsafe rounding. Books on complex interval analysis don't spend much time describing how to implement rounding error compensation. To preserve the postimage warranty (described above), the rounding errors affect the final result by increasing the size of the interval; such rounding is what I call "safe" rounding. If rounding is in the other direction, then it is "unsafe" and the warranty no longer applies. So why calculate "unsafe" when no other author even describes such a process? This calculation is useful because it can be used to detect insufficient precision, as described later.

3D and 4D (and Higher) Dimensions

A generalization of the complex number system to higher dimensions is relatively simple. Each additional dimension requires another imaginary axis. Whereas the single axis for a complex system is called "i", the higher dimensions are called "j", "k", etc.

Unitizing an Optimal Metacomplex Disc Interval, Using Unitized Metacomplex Form

Unitizing is the name of a technique for simplifying the algorithms of some interval operators. This method is utilized by books on complex interval processing. It is described, for reference, below. When unitizing, metacomplex disc intervals are reduced to a disc in the complex plane centered at location 1 on the real axis.

Unitized Metacomplex Form

This method for unitizing is called the unitized metacomplex form.

Nominal Center Location

A "nominal center location" is determined by the mathematical operation associated with the interval operator, but applied just to the center location of the interval operands. For example, if the input operands are quatemion disc intervals, and the operation is multiplication, then the nominal center location is the product of the center locations of the two interval operands. The absolute error (as a Euclidean distance) is computed and saved.

Input Unit Radius or Input Unit Radii (Safe and Unsafe Input Unit Radii)

For each interval operand a unit radius is calculated by dividing the original interval radius by the absolute value of the center location of the same interval operand. Errors in calculating the center and radius are accumulated. The safe input unit radius is the calculated input unit radius plus any accumulated errors. If an unsafe input unit radii is desired, then any accumulated error is subtracted from the input unit radius to create the unsafe input unit radii.

Result Unit Center, Safe Unit Radius, Unsafe Unit Radius

A special operation occurs which creates a resulting unit radius and unit center; this process is unique for each interval operator. Generally, safe and unsafe unit radii are processed separately. The result unit center is considered an exact real value (often near 1 on the real axis). As with calculating the input radii, the safe and unsafe radii are generally calculated separately and all accumulated errors, including absolute error of the unit center, are either added (for the safe radius) or subtracted (for the unsafe radius). These adjustments are similar to that occurring for the input unit radius calculation.

Final Center Location

The resulting unit center, a real value, is a stretching value between 0 and infinity. It is used to scale the previously calculated metacomplex nominal center location to create the final center location. Any absolute error is accumulated and will need to be applied to the radii.

Final Radius, Safe and Unsafe

The final radius for the final center location is calculated in the same proportion to the absolute value of the final center location, as is the unit radius to the result unit center. All relative and absolute errors must be used to adjust the final radius to meet the postimage warranty. All such operations are usually performed separately for safe and unsafe radii.

Non Intrinsic Optimal Disc Interval Operators

Overview

A list of simple, all with zero intrinsic dilution error, optimal interval operators are shown at the top of FIG. 2. The table of FIG. 2 indicates number system, together with an indicator for additional branchcut data. Only the inclusive invert operator (054) offers a new technique over the prior art, and this technique is only to ensure numeric stability. In all cases the absolute error of the center calculation and the rounding error of the radius are used to adjust the radius according to the choice of safe and unsafe rounding.

Inclusive Metacomplex Scalar (050)

A metacomplex scalar takes a metacomplex disc interval and multiplies it by a metacomplex scalar. The new center is simply the original metacomplex location multiplied by the scalar. Similarly, the new radius of the disc is found by scaling the original radius by the absolute value of the metacomplex scalar. The error analysis for metacomplex multiplication of the center location by the scalar was described earlier. Note, in general, the metacomplex dimension of both the disc interval and the scalar will be 2 or 4; multiplying in three dimensional space is limited—see rigid body rotation, immediately following.

Simplified algorithms are possible when the scalar is pure real. A special case is negation; that is when the scalar is −1, there is no rounding error of any kind. All that is required is to negate the center location.

Inclusive Rigid Body Rotation (052)

Rigid body rotation in 3D space is accomplished by pre-multiplying a center location of a 3D hypercomplex interval by a unit length quatemion scalar, and then post-multiplying the result by the conjugate of the same scalar. Of course, to multiply, both values must be a quaternion. Therefore, the original center location is treated as being the 3 imaginary axes, and a zero is used for the real axis. That is, the 3D real value is mapped to the "i" quaternion axis, and the original "i" and "j" are mapped to the "j" and "k" axes. Similarly, after both the pre and post multiplications, the mapping is reversed. The radius is adjusted to affect the postimage warranty. Rigid body rotation is a well known rotation operator utilizing quatemions. Refer to the referenced book *Quaternions and Rotation Sequences*.

Inclusive Invert Operator (054)

The invert operator maps a disc interval to its inverse optimal disc interval, for any dimensional space. Naturally, the invert operation can be used with a power operator (described later) to raise an interval to a negative power. Also, if a multiply operator is available then a divide operator can be easily implemented by a multiplying the dividend interval by the inversion of the divisor interval. Inversion is sometimes considered invalid when the disc interval operand includes zero. In the book, *Complex Interval Arithmetic and its Application*, the authors provide formulas for finding the center and radius of an optimal disc interval for the inverse of a disc interval. The formula requires calculation of a denominator term of $(Abs[center]^2 - r^2)$. this is numerically unstable when the absolute value of the center location is similar to the original radius, denoted by r. None-the-less, the formula can be used directly whenever the absolute value of the center location is more than 2 to 4 times larger than the radius; this may be typical. Here are the formulas: the new center equals the conjugate of the prior center location divided by the denominator described above. The new radius of the optimal disc is simply the prior radius divided by the denominator term. Don't forget to compensate the resulting radius for all accumulated error.

Recall the previously described method of "unitizing", the unitized metacomplex form. When this method is used, the denominator can always be calculated with only a couple unit rounding errors. The unit center location has an absolute value of 1, therefore the denominator term, described above as (Abs[center]^2−r^2) becomes (1−unitRadius^2). (1−unitRadius) (1+unitRadius), where unitRadius is an exact number (typically a floating point value). The term (1+unitRadius) can be calculated with only 1 unit rounding error, as can (1−unitRadius). Although (1−unitRadius) may appear to suffer dramatic digit cancellation error; it does not, when using IEEE correct rounding. The product of these simple terms also produces 1 unit rounding error, for a total of 3 unit rounding errors.

Unit Power Operator (056), Zero Power Operator (058)

These two interval operators have virtually no processing. The unit power operator (056) raises an interval disc to a unit power: the disc interval is unchanged. The zero power operator converts any disc interval to a zero radius disc with a center at unity (real axis equals 1, and all imaginary axes are zero).

Direct Intrinsic Optimal Disc Interval Operators

Overview

Refer to FIG. 2. This section describes disc interval operators which produce results with intrinsic dilution. That is, the mathematical mapping of a metadisc produces a non-metadisc as a true image shape. The new optimal disc interval must enclose the entire postimage shape, which causes some non-image points to be included.

Optimal Inclusive Additive Operator (060)

The inclusive additive operator (060) can be used for both addition and subtraction of two operands: the only difference between addition and subtraction is in the calculation of the center location.

Center Location for Inclusive, Safe and Unsafe

The new center location is given by the metacomplex sum (or difference for subtraction) of the two center locations. The rounding error is typically 1 or 2 unit rounding error. The overall absolute error of the center location can be calculated from this relative error and later used for adjusting the final radius.

Radius-Inclusive, Safe and Unsafe

The preliminary value for the new radius for the optimal inclusive additive operator (038) is simply the sum of the radii of the operands. For safe inclusive processing, the effects of the absolute error of the center location and relative error of the radius calculation directly increase the final radius value. For the unsafe inclusive form, the radius sum is decreased by all the numeric rounding errors.

Inclusive Metacomplex Shape Converter (062)

The difficulty of a shape conversion depends upon the shape. In a typical application, the input shape is a metasquare. In this case the new center location is the center of the metasquare. Be sure to consider any absolute error in the center location, when calculating the radii.

Radius—Inclusive, Safe and Unsafe

For an inclusive conversion, the new radius is simply made large enough to reach every vertex of the metasquare from the center location. For safe processing, the radius must be guaranteed to fully enclose the entire shape, by adding in rounding errors to the radius. For unsafe processing, the rounding errors work to reduce the size of the radius.

Unitizing Range Operator: See FIG. 2

Overview

This section describes a disc interval operator for which the previously described "unitizing" method is employed, referenced by unitized metacomplex form. Generally, when a unitizing operator is used with two operands, both operands are scaled. However, in this case, where one operator is a disc interval and the other a real valued interval, only the disc interval is unitized. Recall that the "Nominal Center Location" step for unitizing involves calculating a center location which will later be adjusted. Here, the Nominal Center Location is the same as the original center location. Another step, Final Center Location, which uses the Nominal Center Location, still functions as before.

Inclusive Metacomplex Range (064), with Unitized Metacomplex Form

This interval operator takes two operands. The first operand is a metacomplex disc interval. The range operand specifies a continuous range of positive values. The operator finds an interval which encloses all possible points found by scaling any point of the disc interval by any point of the range of positive real values. If the metacomplex disc interval is unitized, using the unitized metacomplex form, then a simple method can be used. Two numbers will be computed: a low-end and high-end. The following description results in a unit radius (safe or unsafe, depending upon rounding) and a unit center location. Refer to the section on unitizing for finding the final center location and final safe and unsafe radius values.

High-End Value

The high-end value is easy. It is the largest value of the range times 1+r, where r is the unit radius (safe or unsafe).

Low-End Value

The low-end value depends upon the input unit radius (safe or unsafe) of the unitizing process, called r. If r=1, the low-end value is zero, if r<1, then the low-end value is given by the smallest value of the range times (1−r). Otherwise, r is greater than 1, and the low-end value is given the largest value of the range times (1−r), producing a negative number.

Result Unit Center

The unit center value is given by the average of the low-end and high-end values.

Result Unit Radius

The result unit radius value is 0.5 times the difference in high-end and low-end values.

Optimal Disc Multiplication Interval Operators: See FIG. 2

Overview

As described in the discussion of prior art, there are two main problems with the optimal multiplication of Krier.

First, there is the problem inclusion isotonicity: that is, the results are not always optimal. The problem only appears in degenerate cases where one of the disc intervals is centered at zero. This is trivially fixed by utilizing simple algorithms for special cases. In all cases, where an operand is centered at zero, the result will be centered at zero, and have a radius equal to the product of the radii of both operands. No more need be said, and the remaining discussion is centered on the non-degenerate case where both interval operands have non-origin based center locations. This more difficult case does not have a problem with inclusion isotonicity.

The second problem is much more troublesome as the prior art implies that the real root of a cubic equation is required to be found. This is disturbing, because direct cubic root solution of the equation produces roots which usually are numerically unstable. My multiply implementation a stable expression which returns that same desired real root, and the remainder of the algorithm (for a unitized version), already found in the literature, can be utilized. However, details for unitized method are provided herein.

The following description of multiplication requires use of the previously described "unitizing" method.

Stable Point Multiplication Form and Unitized Metacomplex Form

Regardless of the multiplication method, the use of the previously described stable point multiplication form and the unitized metacomplex form are useful in obtaining the best quality result with numeric stability. Stable Krier Real Root Form The real root is found by evaluating:

$$\frac{\sqrt{3}\, r1 r2\, \text{Sec}\left[\frac{1}{3}\, \text{ArcCos}\left[\frac{3\sqrt{3}\, r1 r2}{(1+r1^2+r2^2)^{3/2}}\right]\right]}{2\sqrt{1+r1^2+r2^2}}$$

In the above expression, r1 and r2 are the unitized radii of the two operands; both are exact values. Only a few commonly available functions need to be available. Note that constants such as the square root of 3 are calculated once. Also, if (1/Sqrt[1+r1^2+r2^2]) is calculated once, and called the INVERTSQRT, then this expression becomes:

$$\frac{1}{2}\sqrt{3}\, r1 r2\, \text{INVERTSQRT}\, [r1, r2]$$

$$\text{Sec}\left[\frac{1}{3}\, \text{ArcCos}\left[3\sqrt{3}\, r1 r2\, \text{INVERTSQRT}\, [r1, r2]^3\right]\right]$$

In typical implementations, a divide operation is often as slow as a square root. By implementing an inverse square root function, performance is greatly improved. If such a routine is not available, then inverting the result of the square root function is similarly stable and precise, but probably takes a little longer.

Reduction to Two Special Functions:

The above formula requires only three special functions: INVERTSQRT[r1,r2] and Sec and ArcCos evaluations. This can be further reduced to two functions by creating a fast approximation, such as a polynomial approximation or rational approximation, for the function Sec[ArcCos[t]/3], called SecThirdArcCos[t].

Analyzing the "t" Parameter

Define t as:

$$3\sqrt{3}\, r1\, r2\, \text{INVERTSQRT}[r1,r2]^3$$

For r1>0 and r2>0, it is easy to show that this function is limited to between 0 and 1. The smallest value is 0 because all terms are positive. The maximum value is found by:

$$\text{Print}\left[\text{Maximize}\left[\frac{3\sqrt{3}\, r1 r2}{(1+r1^2+r2^2)^{3/2}}, r1>0\, \&\&\, r2>0, \{r1, r2\}\right]\right];$$

$$\{1, \{r1 \to 1, r2 \to 1\}\}$$

Clearly t can be evaluated precisely, but can the rounding error be analyzed? Error analysis of real multiplication is straightforward for IEEE arithmetic, and therefore the only issue is for the function call INVERTSQRT. Errors can be analyzed because INVERTSQRT uses a standard sqrt function (which on a good system, rounding error can be kept to 1 or 2 URE). Also the input rounding error INVERTSQRT function is also easy to calculate. In all cases, the for r1>0 and r2>0, the value of t should be limited to between 0 and 1. For example, when the value of t is very close to 1, rounding error may cause it to slightly exceed the value of 1. In such case the ArcCos[t] may return a complex number instead of a real value; it depends upon your system. By limiting t to a maximum of 1, this simple problem is avoided.

Analyzing SecThirdArcCos[t], the Approximating Function

SecThirdArcCos[t], which equals Sec[ArcCos[t]/3], is a smooth over the range of t=0 to t=1.

Print[Table[Sec[ArcCos[i]/3.],{i,0., 1., .2}]];

{1.1547,1.11407,1.07961,1.04975,1.02345,1.}

A very small derivative reduces the effect of any rounding error in the parameter "t". The final error will depend upon the input error, the reduction of the input error by the derivative of the function, and the effect of additional error caused by the function itself. In all cases, a precise, fast and stable function can be achieved with a good polynomial approximation combined with a precise polynomial evaluation method.

Analyzing Sec[ArcCos[t]/3]

If an approximation function is not available, then Sec [ArcCos[t]/3] can be implemented by composing the result of ArcCos[t] with division by 3 following by taking "Sec" function of the result (secant). Suppose the value of t has small relative error near t=1. ArcCos[t] is numerically unstable near t equal 1: much larger relative error is the result. Notice the numeric instability as input values approach 1. In this case, the input value is set to a precision of 15 decimal digits. Notice the decreasing precision of the output as t→1 using Mathematica®s precision tracking numerical software. The SetPrecision function, seen below, sets the decimal digit precision.

Print[temp=Table[ArcCos[SetPrecision[1−(1/2)^n,15]], {n,5, 50,10}]];

{0.25065566233613, 0.007812519868, 0.00024414063, 7.629×10$^{-6}$, 2.4×10$^{-7}$}

Although the above results indicate a rapidly decreasing precision for values near t=1, a more exact readout of precision for each value is possible:

Print[Table[Precision[temp[[i]]],{i,1,Length[temp]}]];

{13.8074,10.7856,7.77528,4.76498,1.75468}

However, the table, of ArcCos[t], has its precision restored for the composition of functions. The following code completes the Sec[ArcCos[t]/3] function for the above values:

Print[final=Table[Sec[temp[[i]]/3],{i,1,Length[temp]}]];

{1.003500640605426,1.000003390868842,1.0000000033 11369,1.000000000003234,1.000000000000003}

These final values have a higher precision than the input.

Print[Table[Precision[final[[i]]],{i,1,Length[final]}]];

{15.9625,15.9543,15.9542,15.9542,15.9542}

This method is stable; the numeric instability in relative error near the extremely fast changing derivative of ArcCos[t] near t=1 is completely mitigated.

Use of Sec[ArcCos[t]/3]

Although a minor performance increase may be found by an approximating function, there the double function calls may be a better approach because widely available methods for implementing Sec and ArcCos allow for arbitrary precision.

Stable Inclusive Complex Multiplication (066)

This interval operator takes two metacomplex disc operands. The resulting metacomplex disc interval represents the optimal inclusive disc interval result for the product of two operands. The algorithm is described based upon both operands transformed by unitizing. (If at least one of the interval operands is centered at zero, then the simple degenerate algorithm, above, is to be used). Use the stable Krier real root form to determine the real root.

Result Unit Center: 1+Root, where Root is the Real Root Described Above. Result Unit Radius:

The result unit radius value is (1+root)*Sqrt[2*root+r1^2+r2^2], where root is the real root described above. Note that the first term (1+root) is the same as the result unit center.

Stable Inclusive Quaternion Multiplication (068)

This operator is implemented identically to the complex case. In searching the little literature I had, I could find no reference to an optimal enclosure for higher dimensions, such as quaternions. However, using the product of a parameterization of the surface of a quaternion disc and a parameterization for a second disc, I was able to show that for random pairs of radii, the non-linear search for the best radii and center location produced the same results as for the complex case. The only difference is that finding the new center involves quaternion arithmetic.

Cubic Inclusive Quaternion Multiplication (070)

This process is the same as the above quaternion means but instead of using the stable Krier real root form, the unstable cubic solution is used. This means should never be used; the stable form above is far superior.

Contractive Power Operators: See FIG. 2

Overview

This section describes disc interval operators raising disc intervals to a positive real power less than 1. Discs are assumed to have a center location which is not the origin. An explicit solution, without unitizing, is provided for all cases. This formula can be used directly, but is numerically unstable when the radius approaches the absolute value of the center location. For cases where stable solutions are not available, the use of approximating polynomials can solve stability problems, at the cost of setting up the polynomial approximation. Similarly, results are for a unitized radius of less than 1; which is to say, the original disc interval operand does not include the origin. Safe and unsafe routines can be developed using methods described earlier for rounding direction of unitized operators. For the special case of square root, an explicit and numerically stable method is shown. If the disc interval, which is used for input, is centered at the origin, then the resulting center location remains at the origin, and the radius is determined by raising it to the specified real power; because of simplicity, this can be considered a degenerative case.

Unitized Contraction Power Form

As pointed out in section 3.5 of *Complex Interval Arithmetic and its Application*, where a proof is provided for $p=1/k$, for k an integer, a simple formula can be used to find the optimal disc interval for p. This formula works more generally for p, where $0 \leq p \leq 1$.

$$\left\{\frac{1}{2}((1-r)^p + (1+r)^p), \frac{1}{2}(-(1-r)^p + (1+r)^p)\right\}$$

Inclusive Complex Contraction Power (072), and Inclusive Hypercomplex Contraction Power (074)

Here, the above described expression, the unitized contraction power expression, is used to find an inclusive interval for hypercomplex interval operands of at least two imaginary axes. The general expression can be evaluated directly or by creating a polynomial approximation.

Stable Inclusive Complex Square Root (076), and Stable Inclusive Hypercomplex Square Root (078), with Radius Square Root Form This interval operator finds an optimal inclusive disc for a square root operator. Of course it requires branchcut criteria to determine the correct branchcut. Unitizing is used. The calculation of the result unit radius requires a numerical trick for numerical stability. Using a unitized formula, the hypercomplex square root is calculated in the identical fashion as the complex case.

Result Unit Center

The unit center value is given by an average:

$$\frac{1}{2}\left(\sqrt{1-r} + \sqrt{1+r}\right)$$

The above expression is stable when used with correct rounding and r as an exact number, which it is when a unitized process is used.

Result Unit Radius: Stable Square Root Form

The required expression for calculating the result unit radius:

$$\frac{1}{2}\left(-\sqrt{1-r} + \sqrt{1+r}\right)$$

is inherently unstable. However, it can be calculated as:

radius square root form =

$$\frac{r}{\sqrt{1-r} + \sqrt{1+r}}$$

Note that the denominator is simply twice that of the calculation for the result unit center; therefore only two square roots are required for the unitized calculation of the center and radius.

Non-Linear Unitizing Expansion Power Operators: See FIG. 2

Overview

Here, the goal is to find an optimal inclusive interval for a disc interval raised to a real power greater than 1. In general, a complete solution is provided in the book *Complex Interval Arithmetic and its Application*, although the authors limit their solution to positive integers, the general concept works with any positive number. By incorporating proper branchcut criteria, and utilizing the unitizing process, the algorithm can be extrapolated for use for any real power greater than 1. This inclusive process can be extended to any hypercomplex dimension to produce optimal inclusive intervals.

Unitized Metacomplex Form: See Earlier Description

Robust Expansion Nonlinear Search Form, Expansion Search Limit Forms

I believe my method of the nonlinear search, called robust expansion nonlinear search form, which includes both lower and upper bounds for a non-linear search, is more robust than that from the above mentioned book. The forms for the extreme search limits are called expansion search limit forms Discs Centered at Origin If the disc interval, which is used for input, is centered at the origin, then the result is almost trivial. The center location remains at the origin, and the radius is determined by raising it to the specified real power.

Crest Approach

In general, both the prior art and the new parameterization rely on parameterizing a unitized radius, centered at $\{1,0\}$ in the complex plane, and finding a point on the circle boundary which when raised to a power "p", where p>1, the image of the point is at the highest point (largest imaginary value) of all image points of the circle. Then, that image point is broken into a real and imaginary parts, where the real part becomes the result unit center and the imaginary part becomes the result unit radius. It is that simple, and the unitized result works in complex as well as hypercomplex dimensions.

Prior Crest Approach

Here is a specific type of method for implementing a crest approach. Without plagiarizing the details, the original approach taken is as follows:

For complex intervals, a complete non-linear solution for finding optimal inclusive disc intervals raised to a power "p", for p and integer, p>1, is described in section 3.4 of *Complex Interval Arithmetic and its Application*. In that book an expression, I call a search function, must be zeroed. This is done by starting a standard non-linear Newton iteration to find the zero by beginning the search at a specified starting point for the parameterization.

The book claims that this method works for positive integers>1. After finding the solution, the parameter value is passed to other ancillary expressions to determine values for a unitized (the book doesn't use the term "unitized") values for the result unit radius and the result unit center. The search function, together with the parameterized solution, can, through standard implicit derivatives, and with derivatives for the ancillary expressions, be used to construct the necessary derivatives for creating polynomial approximation functions. With the proper starting value, the non-linear search can probably be used for any real power greater than 1.

Robust Expansion Nonlinear Search Form: See FIG. 3 Expansion Search Limit Forms

The approach taken for this invention is similar, but also includes both lower and upper bounds to ensure correct iteration for all p>1. A parameterization of a point on a quarter-circle, in the first quadrant, is made, where the circle is center at $\{1,0\}$ of the complex plane, for a parameter "x" ranging from 0 to 1. The circle represents the necessary part of the boundary of the unit radius circle before raising to a power. This method, like the prior method, can be used directly to find optimal inclusive intervals, or can be used to construct polynomial approximations.

Unitized Parameterization

The real axis value is given as $1+r*x$ and the imaginary axis value is given by $r*Sqrt[1-x^2]$.

Ancillary Functions

The ancillary functions, which provide the result unit radius and result unit center, for the correct value of x, are, respectively, the imaginary and real parts of raising the expression $(1+r*x)+I*r*Sqrt[1-x^2]$, to a real power p>1, using the standard definition of a power function in the complex plane. Note that "I" is the square root of −1. That is, use the formula of the starting location and raise it to a power p. The imaginary part of the result is a preliminary unit radius, and the real part is the result unit radius. The preliminary unit radius is converted to a result unit radius using the necessary error adjustments of the unitizing process.

Full Search Function: Robust Expansion Nonlinear Search Form

We seek the largest value of x, $0 \leq x \leq 1$, where the following expression is zeroed, for p=real power greater than 1. Not all of the factors of the following expression may be necessary; however, their removal may affect the speed or success of the search iterations.

robust expansion nonlinear search form =

$$-\frac{1}{\sqrt{1-x^2}}\left(pr(1+r^2+2rx)^{-1+\frac{p}{2}}\left((r+x)\cos\left[p\ \text{ArcTan}\left[\frac{r\sqrt{1-x^2}}{1+rx}\right]\right]-\sqrt{1-x^2}\sin\left[p\ \text{ArcTan}\left[\frac{r\sqrt{1-x^2}}{1+rx}\right]\right]\right)\right)$$

Expansion Search Limit Forms

Lower and upper bounds are specified by expansion search limit forms:

xLower: Lower Bound for Starting Non-Linear Search: See FIG. 3.

Based on simple formula, one of two boundary starting values is determined. The Lower Limit Transition Expression is used when the unit radius is less than Tan [Pi/(2*p)], then use x=0, otherwise x is given by:

$$\frac{-2\sin\left[\frac{\pi}{2p}\right]^2 + 2\cos\left[\frac{\pi}{2p}\right]\sqrt{\left(r-\sin\left[\frac{\pi}{2p}\right]\right)\left(r+\sin\left[\frac{\pi}{2p}\right]\right)}}{2r}$$

Figure 3:
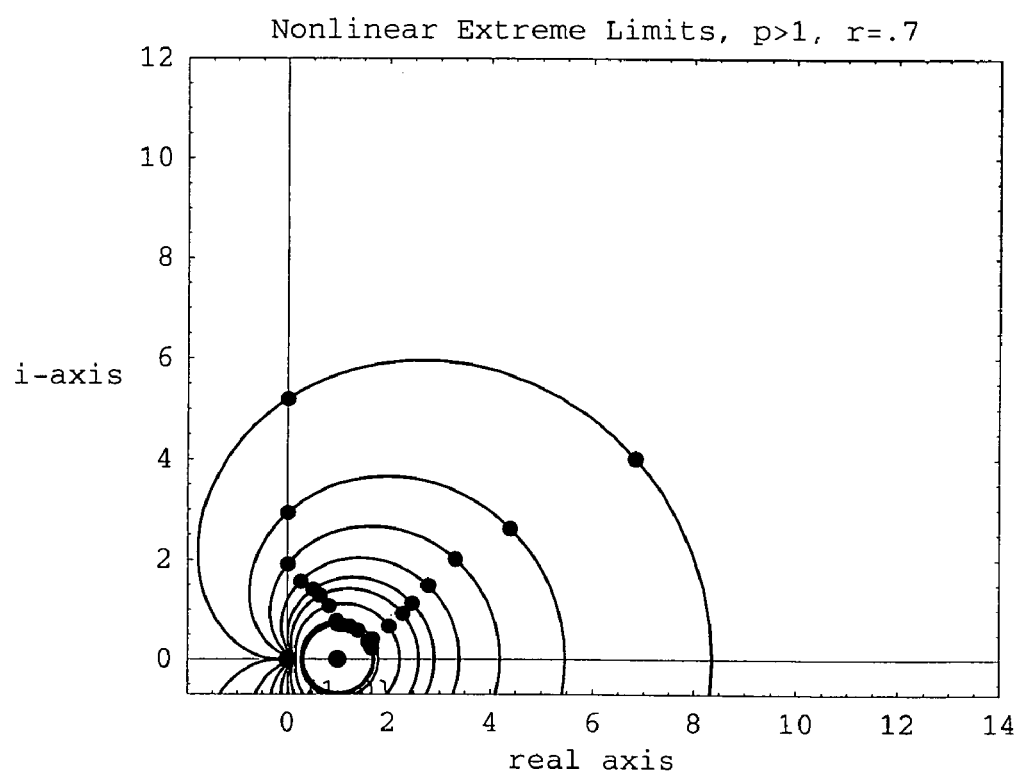
FIG. 3 shows the setup of points to the left and right of crest of a curve, which is the bounded target of a nonlinear search.

The lower bound is illustrated in FIG. 3.

xUpper: Upper Bound for Starting Non-Linear Search: See FIG. 3.

The upper bound is based on the lower bound, and is given by:

Cos [ArcCos [xLower]/3]

The upper bound is also shown in FIG. 3.

Explicit Solutions Root Search

Explicit solutions for x are sometimes available. Once explicit values are found, then they can be used with the ancillary functions to find the result unit radius and result unit center, just as if the x value was found by a non-linear search. For the case of squaring where power=2, the explicit result can be used to compute explicit radius and center functions, as described in the next section. The explicit solutions to the non-linear search function are typically polynomials, where the correct root must be chosen. Some non-zero factors of the full search function can be ignored. Here is one way of finding roots. The following code is written in Mathematica®. Here is the expression which can be used to find explicit solutions.

explicitRootSearchExpression =

$$\left((r+x)\,\text{Cos}\left[p\,\text{ArcTan}\left[\frac{r\sqrt{1-x^2}}{1+rx}\right]\right]-\sqrt{1-x^2}\,\text{Sin}\left[p\,\text{ArcTan}\left[\frac{r\sqrt{1-x^2}}{1+rx}\right]\right]\right);$$

The following routine will sometimes find roots.
ClearAll[explicitRootSearch];
explicitRootSearch[pp_]:=Solve[explicitRootSearchExpression==0/.p→pp,x];
Here it finds explicit solution for squaring:
Print[explicitRootSearch[2]];

$$\left\{\left\{x \to \frac{-1-\sqrt{1+8\,r^2}}{4r}\right\},\left\{x \to \frac{-1+\sqrt{1+8\,r^2}}{4r}\right\}\right\}$$

Here it finds a polynomial solution. Only the first root is shown, the rest are similar.
Print[explicitRootSearch[5][[1]]]

$$\{x \to \text{Root}[-4r+4r^3+\#1-18r^2\#1+5r^4\#1+8r\#1^2-32r^3\#1^2+24r^2\#1^3-20r^4\#1^3+32r^3\#1^4+16r^4\#1^5\,\&,\,1]\}$$

Inclusive Robust Complex Expansion Power (080)

The inclusive robust complex expansion power (080) takes a complex disc interval and raises it to a power p, p>1, to find the optimal inclusive disc interval by using robust expansionary power parameterization, described above, to directly compute the interval, or to evaluate an approximate polynomial created using results from the robust expansionary power parameterization.

Inclusive Hypercomplex Expansion Power (082)

Inclusive hypercomplex expansion power (082) takes a hypercomplex disc interval and raises it to a power p, p>1, to find the optimal inclusive disc interval by using a crest approach parameterization, described above, to directly compute the interval, or to evaluate an approximate polynomial created using results from the robust expansionary power parameterization.

Stable Explicit Power>1 Operator: See FIG. 2, Using Optimal Inclusive Squaring Form Overview A stable optimal inclusive squaring form is described. This form consists of numerically stable evaluations to produce a new radius and center location when squaring a complex or hypercomplex disc interval based on an optimal inclusive squaring form which supplies numeric stability. This section describes disc interval operators for which the previously described "unitizing" method can be usefully employed to create stable explicit and efficient solutions for squaring an interval. The routine requires evaluation of square roots, but because it is explicit, it can be developed for arbitrary precision.

Stable Inclusive Complex Square Power (084)

Stable Inclusive Hypercomplex Square Power (086)

The implementation for squaring is the same for complex or any higher dimension. The use of what I call a optimal inclusive squaring form provides numeric stability.

Squaring Root Expression

A value is needed for computing both the result unit radius and the result unit center. It is stable and easy to analyze for rounding error. We need to compute the value of:

$$(-1+\sqrt{1+8r^2})$$

Because this is unstable for some values of r, the following method is used:

optimal inclusive squaring form = squaringRoot =

$$-\frac{8r^2}{\left(-1-\sqrt{1+8r^2}\right)}$$

Common Squaring Expression

We need to compute another value which will be used for both the result unit radius and the result unit center.

$$CommonSquaring = \frac{4 + SquaringRoot}{8}$$

Result Unit Center

The unit center value is given by: 2*CommonSquaring, or $$\frac{4 + SquaringRoot}{4}$$

Result Unit Radius

The result unit radius value is computed from the common squaring expression and the squaring root:

$$\frac{\sqrt{SquaringRoot + 4r^2}\,(4 + SquaringRoot)}{4\sqrt{2}}$$

Stable Inclusive Metacomplex Three Halves Power (088), Using stable inclusive optimal three halves for, With Three Halves Power Form.

A stable inclusive optimal three halves form is described. This form consists of numerically stable evaluations to produce a new radius and center location when squaring a complex or hypercomplex disc interval. The implementation for three halves power is very similar to the explicit squaring means, except that branchcut criteria are required to specify which of many possible new center locations are required.

The branchcut processing is completely separate from the unitized processing. The complex and hypercomplex processing have identical unitized processing. Unlike squaring, where the explicit x solution is used to create explicit radius and center solutions, here it is often useful to take the explicit x solution and raise the x solution to the 3/2 powers for r, an input unit radius, using a stable complex power function:

$$((1+r*x)+I*r*\text{Sqrt}[1-x^2])^{(3/2)}$$

See above, Ancillary Functions, for extraction of the result unit center and result unit radius after this operation is completed.

3/2 Explicit X-Solution: Three Halves Power Form

The explicit x solution is:

threehalvespowerform =

$$\frac{r}{1+\sqrt{1+4r^2}}$$

Complex and Hypercomplex

A stable inclusive complex three halves power (088) uses the above method for the unitized operands, and using standard procedures for unitizing, it can be used for all such powers, and for both complex and hypercomplex systems (i.e. metacomplex).

Figure 4:
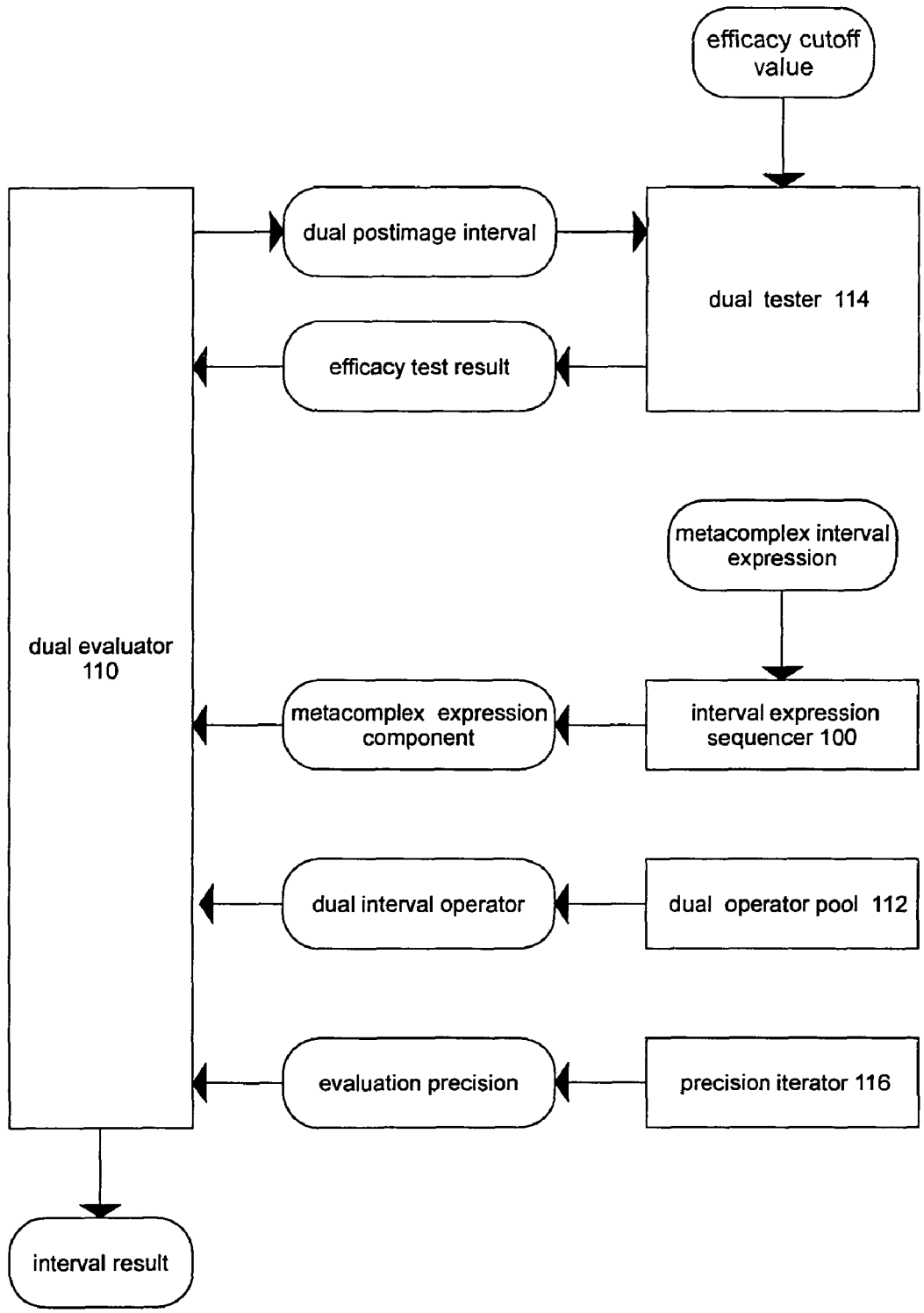
FIG. 4 shows the precision efficacy evaluation embodiment for evaluating an interval expression while detecting inadequate precision.

Dual Rounding Interval Expression Evaluator Embodiment—FIG. 4

Overview

One of the classic problems with numeric processing is knowing when the numeric precision is inadequate to obtain useful results. With general interval processing, the intrinsic dilution of interval operators contributes to the overall dilution (increase in inclusive interval size). Intrinsic dilution and numeric rounding both contribute to dilution, and it is difficult to determine how much contribution is provided by each individually. When working with an interval expression sequencer (100) in the mode of an implicit interval expression, where as described above, all initial values are exact, then the numeric error is the underlying source of all error within the resulting error interval of the final postimage interval.

In most all applications, increasing the precision will decrease the error interval. Therefore, it is easy to determine when numeric precision is inadequate by checking to see if the error interval is too large. However, non-numeric error also enters the postimage interval whenever the initial interval expression is an explicit interval and the interval operators used for evaluation contribute intrinsic dilution. In this embodiment, dual rounding addresses the problem of determining the efficacy of the numeric precision chosen for numeric evaluation.

Intrinsic Error

Refer to the INCLUSIVE INTERVAL OPERATOR COMPENDIUM: See FIG. 2, of the previous chapter.

Implementation

The trick is to track two types of intervals, safe and unsafe: hence the use of "dual" in the name of this embodiment. The safe interval, as in a standard inclusive interval, is created using the processing described earlier. Recall that all numeric errors contribute to increasing the size of the inclusive interval radius. The unsafe intervals are created similarly except that all numeric errors are applied so as to shrink the interval radius. Thus, inclusive postimage intervals for safe rounding tend larger for any given numeric error while unsafe inclusive postimage intervals become smaller. Therefore, the difference in dilution of safe and unsafe postimage intervals results from numeric error. And this same difference can be the basis of determining when the numeric precision is inadequate.

Final Postimage Interval

Although, internally, safe and unsafe postimage intervals are processed separately, the final postimage interval can be returned as a single "safe" interval, provided all numerical efficacy testing is completed. Of course, in applications where additional interval processing occurs upon these same intervals, it might be useful to return both safe and unsafe intervals as the final step of interval evaluation.

Negative Radius Issues

This method cannot be applied to an implicit interval expression, because the starting interval is essentially a point interval and there is no way to round an inclusive interval unsafe interval smaller, For example, a disc interval would obtain a negative radius, and what does that mean? The same issues may arise even when not using disc intervals; for example a rectangular interval could obtain negative lengths for each side. The problem of negative radius (or its equivalent in a non-disc system) may also occur in an explicit interval expression. For example, while performing an unsafe inclusive interval operator, the rounding to decrease the radius may be so exacerbating that the radius goes negative. Such situations would normally trigger an exception error or some other error means to indicate that the usual efficacy testing is impaired.

Optimization

By careful optimization, significant parts of the processing for the separate intervals, safe and unsafe, can be performed just once, saving significant time. The use of this optimization relies heavily on the implementation of the individual interval operators. See the description of dual operator pool (112), below.

Optional Component

Dual evaluation allows detection of inadequate precision. An optional component, precision iterator (116) allows this detection to control the use of higher precision to mitigate rounding effects.

Description: Dual Rounding Interval Expression Evaluator Embodiment, FIG. 4

Overview

The FIG. 4 shows a dual rounding interval expression evaluator embodiment, and is an enhancement of the previous INTERVAL EXPRESSION EVALUATOR EMBODIMENT of FIG. 1; the interval expression sequencer (100) is unchanged; the dual operator pool (112) is a mode of the interval operator pool (104); and the dual evaluator (110) is analogous to the interval evaluator (102) with additional testing mechanisms. The dual tester (114) is used to detect inadequate precision. The precision iterator (116) is optional, and provides automatic iteration of higher and higher evaluation precision.

Interval Expression Sequencer (100)

This component was previously described.

Dual Operator Pool (112)

Overview

The dual operator pool (112) is simply an interval operator pool (104), which in addition to safe rounding, there is the capability to return intervals with unsafe rounding. An dual interval operator returns a dual interval operator—an operator which operates on and produces both safe and unsafe intervals. In many applications, the safe and unsafe intervals are processed at the same time, and this can often be more efficient. However, in other systems where the lowest numeric precision is almost always sufficient, it may be useful to only perform the unsafe rounding when numeric precision is a problem—for example the resulting postimage intervals grow so large as to be unusable.

Simplifying Dual Disc Intervals to One Center

Suppose we have a dual interval represented as separate safe and unsafe intervals, and that we wish to combine them into a dual interval with one center, with both safe and unsafe radii. Assume that the intervals are disc intervals. If the center locations of the safe and unsafe disc intervals are the same, then the radii are used together with the common center and we are done. Otherwise, the center difference is calculated as the distance between the two centers. r an inclusive operation, the center for both safe and unsafe is set to the safe center, and the unsafe radii must be decreased by the center difference, and the rounding errors associated with this and the calculation of the center difference. f course, we could preserve the unsafe center and correspondingly increase the safe radii by the center difference, including any numeric rounding considerations. However, I like the former approach because it preserves the tightness of the safe disc interval, which is usually more important than the tightness of the unsafe disc interval.

Optimizing for a Common Interval Center

For interval operators utilizing a metacomplex unity conversion (see Unitizing an Optimal Metacomplex Disc Interval in the Optimal Interval Operator Compendium, above), a useful optimization is possible when a common center is used for both safe and unsafe disc intervals. The metacomplex unitizing conversion involves the calculation of the unity radius, which in turn, involves dividing each original radius by the absolute value of the center of the interval. The calculations can be time-consuming. However, with a common center, it can be performed once for use by both safe and unsafe processing. This single calculation of a unitized center produces some rounding error, called the center location rounding error, which is an absolute error value. The adjustment needed for this absolute error is different for the safe and unsafe unity radii, and has already been described.

Dual Tester (114)

A dual tester (114) returns an efficacy test result by applying a comparison of a efficacy cutoff value to an efficacy metric of dual postimage interval returned by dual interval operators of the dual operator pool. The efficacy test result is returned as success or failure, based on a comparison to a dual efficacy cutoff value. The dual tester (114) must apply the test in a compatible manner with the dual postimage interval. For example, if the dual efficacy test specification is for a dual disc interval with a common center, then the provided dual interval must be in the same form or converted to a common center.

Dual Intervals

A dual interval is a representation of two intervals created through an identical evaluation sequence except that one sequence used safe rounding and the other sequence used unsafe interval rounding. For an inclusive interval, the unsafe rounding interval will always lie entirely within the shape defined by the safe rounding interval. Because working with two centers and two radii can be cumbersome, and the two centers are relatively close together, a dual interval can also be more simply implemented as a single center with a safe and unsafe radii: see the description of dual operator pool (112) for implementation.

Dual Test: Dual Efficacy Cutoff Value

A dual test is a geometric comparison of the divergence of shapes defined by the safe and unsafe intervals, against a dual efficacy cutoff value which specifies a crossover value used to chose between success and failure of the evaluation precision. Without loss of generality, the dual intervals are defined, herein, by a single center and two radii. For a system that uses a separate center location for safe and unsafe, a conversion to a single center is required—refer to the description of the dual operator pool (112), described next. Here are some useful efficacy tests which might be chosen. Some applications may require custom tests.

Relative Radius Efficacy Test Means

A relative radius efficacy test returns an efficacy failure when the absolute value of the difference of the disc radii divided by larger of the disc radii, is greater than a predetermined relative radius cutoff.

Relative Error Efficacy Test Means

A relative radius efficacy test returns an efficacy failure when the absolute value of the difference of disc radii divided by the average of the absolute value of disc centers, is greater than a predetermined relative error cutoff.

Absolute Radius Efficacy Test Means

An absolute radius efficacy test returns an efficacy failure when the absolute value of the difference of disc radii is greater than a predetermined absolute radius cutoff.

Precision Iterator (116)

At the bottom of FIG. 4 there is an optional component: precision iterator (116). When present, it provides a way to iterate through a series of evaluation precisions. For example, the lowest precision level might be 53, specifying the number of mantissa bits in a IEEE standard double precision floating point. The next higher precision might be 128 mantissa bits, representing an integer implementation of hardware floating point using two 64-bit numbers.

Dual Evaluator (110)

The dual evaluator (110), an enhancement of the earlier described interval evaluator (102), takes advantage of dual rounding to detect and optionally act on inadequate numeric precision. The dual evaluator (110) manages dual postimage intervals; however, if intervals are implemented in an object oriented manner of modern software programming, then the different interval type (dual interval versus a simple safe interval), can be transparent.

The real difference from a simpler interval evaluator (102) is that the dual evaluator (110) must call the dual tester (114). This is a simple process. A failure might be implemented by an error return or exception. When the optional component, precision iterator (116), is present, then, when efficacy fails, a higher precision can be tried. If all evaluation precisions fail, or the optional precision iterator (116) is not present, then the dual evaluator (110) signals inadequate precision.

Operation: Dual Rounding Interval Expression Evaluator Embodiment, FIG. 4

This embodiment operates nearly identically to the INTERVAL EXPRESSION EVALUATOR EMBODIMENT. However, the program calling it to return a interval should be aware that it can return an error of inadequate precision. In modern programming, this type of error is typically returned as an "exception", but a simple error flag can also be returned. When iteration is used, it is analogous to commercial programs, such as Mathematica®, where the evaluator routine, "N", repeats evaluation at successively higher precision until a desired resulting precision is achieved. The difference is that repetition is based not on a specific goal to achieve a desired precision, but rather on a different type of test: the comparison of safe and unsafe intervals.

CONCLUSION, RAMIFICATIONS, AND SCOPE

Embodiments are described for producing interval results from a metacomplex interval expression. The inventions are particularly addressed to optimal inclusive complex and hypercomplex disc interval processing. The embodiments for dual rounding and tightness apply to any metacomplex interval operators.

In some applications, additional special case interval operators will be useful. Other interval operators, particularly transcendental functions, are described in the book *Complex Interval Arithmetic and Its Applications*. These additional operators can also be used within the interval operator pool (104) or the dual operator pool (112).

I claim:

1. A machine executed method to evaluate a metacomplex interval expression to return a metacomplex interval that includes all image points of the evaluation, comprising:
  (A) specifying, by an interval evaluator in a machine, an evaluation sequence of interval operators, interval operands, and postimage intervals, for the interval expression, including branchcut criteria for said interval operands which require auxiliary branchcut information,
  (B) selecting at least one interval operator from an interval operator pool in the machine, wherein the at least one interval operator is selected from a group consisting of:
    (1) an inclusive metacomplex range operator to compute an optimal inclusive complex disc interval of a product of a metacomplex disc interval times a positive real valued interval, wherein digit cancellation error is eliminated by use of the unitized metacomplex form and stable point multiplication form,
    (2) an inclusive complex multiplication operator to compute an optimal inclusive complex disc interval of a product of two complex disc intervals, by evaluating a stable optimal multiplication form, wherein digit cancellation error is eliminated by use of the unitized metacomplex form and stable point multiplication form,
    (3) an inclusive quaternion multiplication operator to compute an optimal inclusive quaternion disc interval as a product of two quaternion disc intervals based on stable Krier real root form as a real root solution of a cubic equation, wherein digit cancellation error is eliminated and optimal disc inclusive processing of multiplication is extended to higher dimensions,
    (4) a cubic inclusive quaternion multiplication operator to compute an optimal inclusive quaternion disc interval as a product of two quaternion disc intervals based on a real root solution of a cubic equation, wherein optimal disc inclusive processing of multiplication is extended to quaternions,
    (5) an inclusive complex contraction power operator to compute an optimal inclusive complex disc interval as a result of raising a complex disc interval to a positive real power less than 1, based on a unitized contraction power form, with a branchcut chosen through a branchcut criteria based on mapping the center location of the disc interval,
    (6) an inclusive hypercomplex contraction power operator to compute an optimal inclusive hypercomplex disc interval as a result of raising a hypercomplex disc interval to a positive real power less than 1, based on a unitized contraction power form, with a branchcut chosen through a branchcut criteria based on mapping the center location of the disc interval,
    (7) an inclusive complex square root operator to compute an optimal inclusive complex disc interval as a result of taking the square root of a complex disc interval, with a branchcut chosen, through a branchcut criteria based on mapping the center location of the disc interval, wherein digit cancellation error is eliminated by use of a radius square root form,
    (8) an inclusive hypercomplex square root operator to compute an optimal inclusive hypercomplex disc interval as a result of taking the square root of a hypercomplex disc interval with a branchcut chosen through a branchcut criteria based on mapping the center location of the disc interval, wherein digit cancellation error is eliminated by use of a radius square root form and optimal disc inclusive processing of square roots is extended to hypercomplex dimensions,
    (9) an inclusive complex expansion power operator to compute an optimal inclusive complex disc interval as a result of raising a complex disc interval to a real power greater than 1 with a branchcut chosen, when the power is not an integer, through a branchcut criteria based on mapping the center location of the disc interval, by use of the unitized metacomplex form, robust expansion nonlinear search form, and expansion search limit forms,
    (10) an inclusive hypercomplex expansive power operator to compute an optimal inclusive hypercomplex disc interval as a result of raising a hypercomplex disc interval to a real power greater than 1, with a branchcut chosen, when the power is not an integer, through a branchcut criteria based on mapping the center location of the disc interval, by use of the unitized metacomplex form, robust expansion nonlinear search form, and expansion search limit forms,
    (11) an inclusive complex square power operator for inclusively evaluating a squaring of a complex disc interval using a stable optimal inclusive squaring form, wherein digit cancellation error is eliminated by use of the optimal inclusive squaring form,
    (12) an inclusive hypercomplex square power operator for inclusively evaluating a squaring of a hypercomplex disc interval using an stable optimal inclusive squaring form, wherein digit cancellation error is eliminated by use of the optimal inclusive squaring form and optimal disc inclusive processing of square roots is extended to hypercomplex dimensions,
    (13) an inclusive metacomplex three halves power operator to compute an optimal inclusive metacomplex disc interval as a result of raising a metacomplex disc interval to three halves power, using a three halves power form, with a branchcut chosen, through a branchcut criteria based on mapping the center location of the disc interval, wherein digit cancellation error is eliminated and optimal disc inclusive processing of square roots is extended to hypercomplex dimensions,
  (C) numerically evaluating, by an interval evaluator in the machine, said predetermined metacomplex interval expression, by iterating through the interval operators of the evaluation sequence and applying corresponding interval operators from the interval operator pool using the interval operator selection,
  (D) returning the interval result from the numerical evaluation that includes all possible point evaluation results of the evaluation of the interval expression.

2. The method of claim 1 wherein the selecting of the at least one interval operator from the interval operator pool includes selecting said inclusive metacomplex range operator.

3. The method of claim 1 wherein the selecting of the at least one interval operator from the interval operator pool includes selecting said inclusive complex multiplication operator.

4. The method of claim 1 wherein the selecting of the at least one interval operator from the interval operator pool includes selecting from a group consisting of: said inclusive quaternion multiplication operator and said cubic inclusive quaternion multiplication operator.

5. The method of claim 1 wherein the selecting of the at least one interval operator from the interval operator pool includes selecting from a group consisting of: said inclusive complex contraction power operator, said inclusive hypercomplex contraction power operator, said inclusive complex expansion power operator, and said inclusive hypercomplex expansive power operator.

6. The method of claim 1 wherein the selecting of the at least one interval operator from the interval operator pool includes selecting from a group consisting of: said inclusive complex square root operator, and said inclusive complex square power operator.

7. The method of claim 1 wherein the selecting of the at least one interval operator from the interval operator pool includes selecting from a group consisting of: said inclusive hypercomplex square root operator, and said inclusive hypercomplex square power operator.

8. The method of claim 1 wherein the selecting of the at least one interval operator from the interval operator pool includes selecting said inclusive metacomplex three halves power operator.

* * * * *